United States Patent [19]

Baba et al.

[11] 3,828,294
[45] Aug. 6, 1974

[54] ACCELERATION TRANSDUCER HAVING SEMICONDUCTIVE PIEZORESISTIVE ELEMENT

[75] Inventors: Kosaku Baba, Yokohama; Kiyoshi Wazawa, Tokyo; Akio Hosaka, Yokohama, all of Japan

[73] Assignee: Nissan Motor Company, Limited, Kanagawa-ku, Yokohama City, Japan

[22] Filed: Apr. 10, 1972

[21] Appl. No.: 242,429

[30] Foreign Application Priority Data
Aug. 2, 1971  Japan.............................. 46-69025

[52] U.S. Cl............................. 338/43, 338/4, 338/5, 338/36, 338/47
[51] Int. Cl............................................... H01c 7/16
[58] Field of Search................ 338/4, 5, 43, 44, 32; 73/88.5 SD, 516 R, 516 M, 517 R

[56] References Cited
UNITED STATES PATENTS

| | | | |
|---|---|---|---|
| 3,149,488 | 9/1964 | Castro | 73/88.55 SD |
| 3,392,576 | 7/1968 | Hollander, Jr. | 73/517 R |
| 3,513,430 | 5/1970 | Heller | 338/2 X |
| 3,654,579 | 4/1972 | Kurtz | 338/2 |
| 3,697,917 | 10/1972 | Orth | 338/2 |

Primary Examiner—C. L. Albritton
Attorney, Agent, or Firm—Robert E. Burns; Emmanuel J. Lobato; Bruce L. Adams

[57] ABSTRACT

An acceleration transducer comprising a semiconductive plate having therein at least one piezoresistive element. The semiconductive plate is strained by a force exerted by a weight which is adapted to be movable according to an acceleration applied to the transducer. Due to the strain of the semiconductive plate, the element is varied in proportion to the amount of strain thereof. The variation of the resistivity of the element is therefore proportional to the magnitude of the acceleration applied to the transducer and utilized as an acceleration signal. The acceleration transducer is simple and compact in construction and has improved temperature and frequency characteristics.

4 Claims, 4 Drawing Figures

ACCELERATION TRANSDUCER HAVING SEMICONDUCTIVE PIEZORESISTIVE ELEMENT

This invention relates to acceleration transducers for movers, and more particularly to an acceleration transducer which utilizes a semiconductive plate having formed therein a semiconductive piezoresistive element.

In order to improve the safety and/or the drivability of a motor vehicle, various apparatus have been recently developed which are, for example, an airbag system, a skid control system and an electrically controlled automatic transmission system. In these systems, an acceleration signal usually possesses an important position, so that, a precise acceleration transducer has been earnestly desired.

Several acceleration transducers have, therefore, been devised, one of which utilizes an electric resistance wire strain gauge incorporated with a weight. The electric resistance wire is strained by a force caused by an acceleration applied on the weight.

Such transducer has a narrowed available temperature range and complicated construction because the resistance wire of the transducer should be incorporated with a mechanical or electrical damper so as to reduce natural frequency of the resistance wire in order to obtain sufficiently high sensitivity from the transducer.

It is therefore an object of this invention to provide an acceleration transducer having a wide available temperature range.

Another object is to provide an acceleration transducer having a high sensitivity.

Still another object is to provide an acceleration transducer with high reliability and long life time.

Still further object is to provide an acceleration transducer with an improved frequency characteristics.

Still further object is to provide a simple and economical acceleration transducer.

Still further object is to provide an acceleration transducer suitable for a motor vehicle.

These and other objects and advantages of this invention will be set forth with further particularity or will become apparent in the following description with reference to the figures appended thereto in which.

Like characters of reference designates like parts in the several views.

Figure 1:
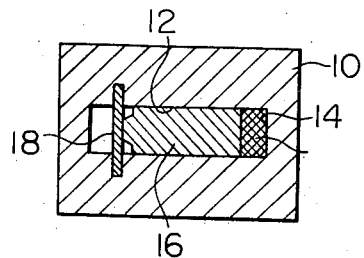
FIG. 1 is a sectional view of an acceleration transducer according to this invention.

Referring now to FIG. 1, an acceleration transducer according to this invention is illustrated, which comprises a housing 10 made of a rigid material having an elongated bore 12 therein. A resilient member 14 is fastened in one endmost portion of the elongated bore 12. A rigid weight member 16 is slidably accommodated in the remaining portion of the bore 12 in a manner as to contact at its one end to one surface of the resilient member 14. A semiconductive plate 18 is fixed in the bore 12 to traverse the bore 12 and to contact at its one major surface with the other end surface of the weight member 16 so that the weight member 16 is confined between the resilient member 14 and the semiconductive plate 18. The other end of the weight member 16 and the major surface of the plate 18 are fastened with each other so as to make the transducer bilaterally operative. In this instance, the major surface of the plate 18 may be coated with aluminium to make easy the connection between the plate 18 and the weight 16. Of course, the weight member 16 and plate 18 may be merely attached to each other and the member 14 may be negligible when the transducer is intended to be unilaterally operable. The other end of the weight 16 is shaped to have a projection in its central portion as shown in the figure, if desired. In either one or both of the major surfaces of the semiconductive plate 18 is formed through a known integrated circuit technique at least one piezoresistive element which has a resistivity varied in proportion to a strain therein caused by a force applied to the semiconductive plate 18. To the piezoresistive element connected an electric circuit (not shown) which is adapted to detect the variation of the resistivity of the piezoresistive element.

When the transducer is mounted on a mover such as a motor vehicle and subjected to an acceleration in a direction along the axis of the elongated bore 12, the rigid weight member 16 is urged to or pulled from the plate 18 to strain the plate 18. The resistivity of the element varies in proportion to the strain thereof, which variation is picked up through the electrical circuit which transduces the variation into an electric signal, that is, an acceleration signal.

Figure 2:
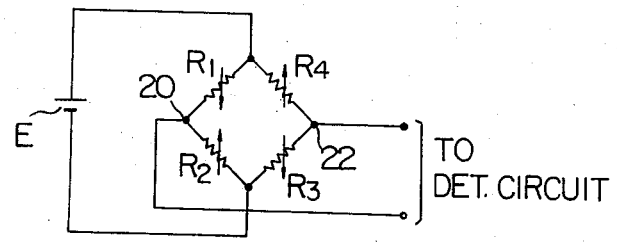
FIG. 2 is a diagram showing an electrical circuit equivalent to the transducer of FIG. 1.

When piezoresistive elements are formed in the semiconductive plate 18, an electric circuit connected to the elements as shown in FIG. 2, wherein variable resistors $R_1$, $R_2$, $R_3$ and $R_4$ respectively represent the piezoresistive elements connected to one another in a bridge form. To a junction between the variable resistors $R_1$ and $R_4$ is connected a positive terminal of a d-c power source E a negative terminal of which is connected to a junction between the variable resistors $R_2$ and $R_3$. Junctions 20 and 22 between resistors $R_1$ and $R_{2'}$ and $R_3$ and $R_4$ are respectively connected to the detecting circuit which detects variation of the voltage appearing across the junctions. As long as no force is exerted on the plate 18, no voltage is developed in the elements, which condition corresponds to the state that all the resistances of the resistors $R_1$, $R_2$, $R_3$ and $R_4$ are equal to one another and no voltage is built up across the junctions 20 and 22.

When the transducer is subjected to an acceleration $\alpha$ in the direction along the axis of the bore 14, a force $f$, which is equal to $m\alpha$, is exerted on the weight 16 where $m$ represents a mass of the weight 16. The force $f$ is therefore applied to the plate 18 in a direction perpendicular to the major surface thereof. Due to the force $f$, a strain $\epsilon$ proportional to the force $f$ takes place in the plate 18, namely, the piezoresistive element whereby the resistivities of the elements are varied in proportion to the strain $\epsilon$. Therefore, the resistances of the resistors $R_1$ and $R_2$ reduce a increase in proportion to the strain $\epsilon$ and, on the contrary, those of the resistors $R_3$ and $R_4$ increase or reduce in proportion to the strain, whereby a voltage proportional to the strain appears across the junctions 20 and 22.

Figure 3:
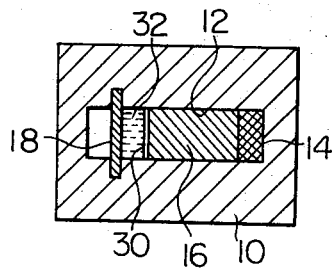
FIG. 3 is a sectional view of another acceleration transducer according to this invention.

FIG. 3 illustrates another embodiment of this invention which has the same construction as that of FIG. 1 except that a sealing member 30 is mounted on the end surface of the weight member 16 and an inert liquid 32 inactive with the plate 18 is filled between the sealing member 30 and the plate 18. The sealing member hermetically seals between the peripheral wall of the weight member 16 and the inner wall of the bore 12 so as to prevent the liquid 32 from leaking out. When the transducer is intended to be bilateral, the sealing member 30 should be fastened to the end surface of the weight member 16, but the fastening is unnecessary when the transducer is intended to be unilateral and the resilient member 14 may be omitted.

Being thus constructed, this transducer is advantageous in that the liquid 32 interposed between the weight member 16 and the plate 18 protects the plate 18 from the rigid weight member 16 so that the durability of the transducer is preferably improved.

Figure 4:
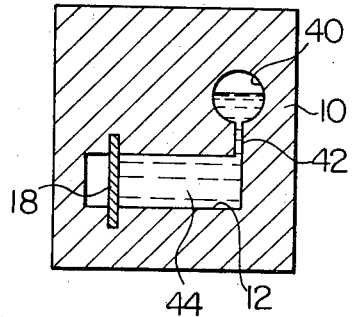
FIG. 4 is a sectional view of still another acceleration transducer according to this invention.

FIG. 4 shows another embodiment of this invention which comprises a housing 10 having an elongated bore 12 which has a construction similar to that of FIG. 1 except that a spherical bore 40 is formed in a portion of the housing 10. The bore 40 is preferably apart from the bore and communicated through a conduit 42. The spherical bore 40, conduit 42, bore 12 and the plate 18 constitute a chamber, which contains a liquid 44 having a relatively large specific gravity such as mercury. The chamber should not be perfectly filled with the liquid 44 in order to prevent erroneous operation of the transducer due to the thermal expansion of the liquid 44.

When the transducer is subjected to an acceleration, the liquid exerts a pressure proportional to the acceleration or the plate 18 the piezoelectrical element of which is then produces a voltage proportional to the acceleration.

It will be appreciated that the transducer hereinabove described is characterized by simplicity and compactness to operate with high reliability, durability and sensitivity. Furthermore, the particular transducer has preferred frequency and temperature characteristics.

There has been disclosed heretofore certain specific embodiments of this invention and it is to be understood that various changes and modifications may be made by those skilled in the art without departing from the spirit of this invention.

What is claimed is:

1. An acceleration transducer comprising: a deformable semiconductive member; at least one piezoresistive element having a resistance characteristic wherein the magnitude of the resistance varies in response to the magnitude of compressive and tensile forces applied to the element; means mounting said element on at least one deformable surface of the member to receive therefrom the stress forces developed in response to the deformation of the member, said stress forces comprising compressive and tensile forces on said element; and means responsive to variable acceleration forces for effecting variable deformation of said member to thereby result in variable stress forces applied to said element which vary the magnitude of the resistance thereof comprising a housing having an elongated bore therein and mountable in an acceleratable object, means mounting said member in said bore and disposing the deformable surfaces thereof perpendicular to the longitudinal axis of said bore, and a gravity member reciprocatably mounted in said bore and having one end portion thereof in contact with a deformable surface of said semiconductive member and movable in response to acceleration forces applied along said longitudinal axis to deform said semiconductive member.

2. An acceleration transducer according to claim 1, wherein said one end portion of said gravity member is fixedly attached to said deformable surface of said semiconductive member.

3. An acceleration transducer according to claim 1, wherein said means for effecting variable deformation of said semiconductive member further comprises a resilient member disposed between the other end portion of said gravity member and one end of said bore for damping the movement of said gravity member.

4. An acceleration transducer according to claim 1, further comprising circuit means responsive to the variations in the magnitude of the resistance of said element for developing a variable electrical signal proportional thereto.

* * * * *